United States Patent
Eyestone et al.

(10) Patent No.: US 10,806,081 B2
(45) Date of Patent: Oct. 20, 2020

(54) CROP DEFLECTOR FOR A HARVESTING HEAD

(71) Applicant: DEERE & COMPANY, Moline, IL (US)

(72) Inventors: Jody I. Eyestone, Milan, IL (US); Justin C. Freehill, Fenton, IL (US)

(73) Assignee: DEERE & COMPANY, Moline, IL (US)

( * ) Notice: Subject to any disclaimer, the term of this patent is extended or adjusted under 35 U.S.C. 154(b) by 195 days.

(21) Appl. No.: 16/020,072

(22) Filed: Jun. 27, 2018

(65) Prior Publication Data

US 2019/0075730 A1   Mar. 14, 2019

Related U.S. Application Data

(60) Provisional application No. 62/558,410, filed on Sep. 14, 2017.

(51) Int. Cl.
| A01D 61/00 | (2006.01) |
| A01D 34/04 | (2006.01) |
| A01D 57/20 | (2006.01) |

(52) U.S. Cl.
CPC ........... *A01D 61/008* (2013.01); *A01D 34/04* (2013.01); *A01D 57/20* (2013.01); *A01D 61/002* (2013.01)

(58) Field of Classification Search
CPC ...... A01D 61/008; A01D 57/20; A01D 34/04; A01D 61/002; A01D 57/03
See application file for complete search history.

(56) References Cited

U.S. PATENT DOCUMENTS

| 2,774,210 | A | | 12/1956 | Kay |
| 2,776,483 | A | | 1/1957 | Nikkel |
| 3,021,662 | A | | 2/1962 | Raymond |
| 4,290,259 | A | * | 9/1981 | Parvin ................. A01D 61/008 56/364 |
| 7,520,117 | B2 | * | 4/2009 | Rieck ................... A01D 45/021 56/62 |

(Continued)

FOREIGN PATENT DOCUMENTS

EP   2989883 A1   3/2016

OTHER PUBLICATIONS

European Search Report, EP18193088.4, dated Feb. 12, 2019, pp. 1-10.

*Primary Examiner* — Arpad Fabian-Kovacs
(74) *Attorney, Agent, or Firm* — Taft Stettinius & Hollister LLP; Stephen F. Rost

(57) ABSTRACT

Harvesting machines and agricultural harvesting heads for harvesting machines are disclosed herein. A harvesting machine includes a frame, an elongate reciprocating knife, a conveyor system, a drum conveyor, and a crop deflector. The elongate reciprocating knife is coupled to a forward edge of the frame and configured to cut crop material adjacent to the ground. The conveyor system is supported by the frame and configured to carry cut crop material toward a central portion of the frame and rearward therefrom. The drum conveyor is located directly behind at least a portion of the conveyor system, and the drum conveyor includes an elongate cylindrical drum supported for rotation on the frame about a drum axis and a plurality of elongate fingers that at least partially extend through an outer wall of the cylindrical drum.

19 Claims, 5 Drawing Sheets

(56) References Cited

U.S. PATENT DOCUMENTS

| | | | |
|---|---|---|---|
| 8,166,738 B1 * | 5/2012 | Coers | A01D 61/002 |
| | | | 56/181 |
| 8,997,445 B2 | 4/2015 | Koch et al. | |
| 9,301,445 B1 | 4/2016 | Seeliger | |
| 10,477,767 B2 * | 11/2019 | Modak | A01D 61/004 |
| 10,477,770 B2 * | 11/2019 | Modak | A01D 61/008 |
| 2005/0016147 A1 * | 1/2005 | Patterson | A01D 41/14 |
| | | | 56/181 |
| 2008/0098705 A1 * | 5/2008 | Salley | A01D 41/06 |
| | | | 56/16.4 R |
| 2013/0298516 A1 | 11/2013 | Houston | |
| 2016/0295800 A1 * | 10/2016 | Allochis | A01D 34/14 |
| 2017/0208738 A1 * | 7/2017 | McCrea | A01D 34/14 |
| 2018/0054964 A1 * | 3/2018 | Fuchtling | A01D 61/02 |

\* cited by examiner

CROP DEFLECTOR FOR A HARVESTING HEAD

CROSS-REFERENCE TO RELATED APPLICATION

This application claims priority to, and the benefit of, U.S. Provisional Patent Application Ser. No. 62/558,410 entitled "CROP DEFLECTOR FOR A HARVESTING HEAD" by Jody Eyestone et al., which was filed on Sep. 14, 2017, the entirety of which is incorporated by reference herein.

FIELD OF THE DISCLOSURE

The present disclosure relates, generally, to agricultural harvesters, and, more specifically, to harvesting heads for agricultural combines.

BACKGROUND

Agricultural harvesters, such as agricultural combines, may be designed to travel through agricultural fields harvesting crops. Agricultural combines may convey crop material severed from the ground to threshing, separating, and cleaning devices within the agricultural combine. In some cases, a self-propelled agricultural harvesting vehicle may include a harvesting head having one or more mechanisms to move crop material through the harvesting head.

In some situations, crop material moved through the harvesting head may depart a desired flow path. Harvesting heads with features that address the drawbacks of conventional harvesting heads remain an area of interest.

SUMMARY

The present disclosure may comprise one or more of the following features and combinations thereof.

According to one aspect of the present disclosure, a harvesting machine may include a frame, an elongate reciprocating knife, a conveyor system, a drum conveyor, and a crop deflector. The elongate reciprocating knife may be coupled to a forward edge of the frame and configured to cut crop material adjacent to the ground. The conveyor system may be supported by the frame and configured to carry cut crop material toward a central portion of the frame and rearward therefrom. The drum conveyor may be located directly behind at least a portion of the conveyor system, and the drum conveyor may include an elongate cylindrical drum supported for rotation on the frame about a drum axis and a plurality of elongate fingers that at least partially extend through an outer wall of the cylindrical drum. The crop deflector may be supported by the frame and positioned in close proximity to the outer wall of the cylindrical drum and the plurality of elongate fingers, and the crop deflector may be configured to interface with the outer wall of the cylindrical drum and the plurality of elongate fingers to deflect crop material such that the deflected crop material may pass rearward of the drum conveyor through the harvesting machine during operation thereof.

In some embodiments, the crop deflector may include a plurality of recesses that are each configured to receive a corresponding one of the plurality of elongate fingers. The plurality of recesses may extend upwardly away from a lower edge of the crop deflector, and the lower edge may extend continuously between adjacent recesses of the plurality of recesses.

In some embodiments, a lower edge of the crop deflector may be configured to engage the outer wall of the cylindrical drum and the plurality of elongate fingers to deflect crop material during operation of the harvesting machine. The lower edge of the crop deflector may be configured to engage the plurality of elongate fingers when the plurality of elongate fingers are withdrawn into the cylindrical drum such that the plurality of elongate fingers minimally extend beyond the outer wall of the cylindrical drum during operation of the harvesting machine.

In some embodiments, the crop deflector may include a lower portion that is generally planar and located in close proximity to the cylindrical drum and to the plurality of elongate fingers, and the lower portion may be disposed at an acute angle relative the outer wall of the cylindrical drum. The crop deflector may be angled relative to the cylindrical drum and the plurality of elongate fingers such that the crop deflector is configured to deflect crop material radially outward from the drum axis and away from the cylindrical drum and the plurality of elongate fingers during operation of the harvesting machine.

In some embodiments, the plurality of elongate fingers may be supported on an axle that is configured for rotation about a longitudinal axis during operation of the harvesting machine, and the longitudinal axis may be located forward of the drum axis. The crop deflector may be configured to engage the plurality of elongate fingers at locations behind the longitudinal axis and the drum axis during operation of the harvesting machine.

In some embodiments, the crop deflector may be constrained against pivotal movement relative to the frame. Additionally, in some embodiments, the frame may include a member that covers the cylindrical drum to define a gap between the member and the cylindrical drum, and the crop deflector may be disposed in the gap. The crop deflector may be removably coupled to the frame in the gap.

According to another aspect of the present disclosure, an agricultural harvesting head may include a frame, an elongate reciprocating knife, at least one conveyor, a drum conveyor, and a crop deflector. The elongate reciprocating knife may be coupled to the frame and configured to cut crop material. The at least one conveyor may be configured to carry cut crop material rearward. The drum conveyor may be located behind the at least one conveyor, and the drum conveyor may include an elongate cylindrical drum supported for rotation on the frame about a drum axis and a plurality of elongate fingers that at least partially extend through an outer wall of the cylindrical drum. The crop deflector may include an elongate member that is rigidly affixed to the frame and located between the frame and the elongate cylindrical drum.

In some embodiments, the crop deflector may be configured to interface with the outer wall of the cylindrical drum and the plurality of elongate fingers to deflect crop material such that the deflected crop material may pass rearward of the drum conveyor through the agricultural harvesting head during operation thereof. Additionally, in some embodiments, the plurality of elongate fingers may be supported on an axle that is configured for rotation about a longitudinal axis located forward of the drum axis during operation of the agricultural harvesting head, and the crop deflector may be configured to engage the plurality of elongate fingers at locations behind the longitudinal axis and the drum axis during operation of the agricultural harvesting head.

In some embodiments, a lower edge of the elongate member may include a plurality of recesses, and each of the plurality of recesses may be positioned to receive a corresponding one of the plurality of elongate fingers. The plurality of recesses may be disposed in close proximity to the cylindrical drum and the plurality of elongate fingers at locations behind the drum axis.

In some embodiments, the crop deflector may include a lower portion that is generally planar and located in close proximity to the cylindrical drum and to the plurality of elongate fingers, and the lower portion may be disposed at an acute angle relative the outer wall of the cylindrical drum. The crop deflector may be angled relative to the cylindrical drum and the plurality of elongate fingers such that the crop deflector is configured to deflect crop material radially outward from the drum axis and away from the cylindrical drum and the plurality of elongate fingers during operation of the agricultural harvesting head.

According to yet another aspect of the present disclosure, an agricultural harvesting head may include a frame, an elongate reciprocating knife, at least one conveyor, a drum conveyor, and a crop deflector. The elongate reciprocating knife may be coupled to the frame and configured to cut crop material. The at least one conveyor may be configured to carry cut crop material rearward. The drum conveyor may be located behind the at least one conveyor, and the drum conveyor may include a cylindrical drum supported for rotation on the frame about a drum axis and a plurality of elongate fingers that at least partially extend through an outer wall of the cylindrical drum. The crop deflector may be rigidly affixed to the frame and located between the frame and the cylindrical drum to deflect crop material such that the deflected crop material may pass rearward of the drum conveyor through the agricultural harvesting head during operation thereof.

According to yet another aspect of the present disclosure still, an agricultural harvesting head may include a frame, an elongate reciprocating knife, left side and right side conveyors, a center conveyor, a drum conveyor, and a crop deflector. The frame may extend perpendicular to a direction of travel for harvesting crops. The elongate reciprocating knife may be fixed to a forward edge of the frame and configured to cut crop plants adjacent to the ground. The left side and right side conveyors may be configured to carry crops laterally inward to a central portion of the frame. The center conveyor may be disposed between the left side and right side conveyors, and the center conveyor may be disposed to receive cut crop material carried to the central portion of the frame by the left side and right side conveyors, and to carry the cut crop material rearward. The drum conveyor may be located directly behind and above the center conveyor, and the drum conveyor may include an elongate cylindrical drum supported for rotation on the frame at opposing ends of the cylindrical drum about a horizontal and laterally extending axis, and a plurality of elongate fingers extending through a side wall of the cylindrical drum. The crop deflector may be in close engagement with an outer wall of the cylindrical drum and with the plurality of elongate fingers.

In some embodiments, the crop deflector may include a plurality of recesses each configured to accommodate a corresponding one of the plurality of elongate fingers. Each of the plurality of recesses may correspond to one of the plurality of elongate fingers.

In some embodiments, the crop deflector may include a plurality of lower edges that extend toward a surface of the cylindrical drum, and each of the plurality of lower edges may be disposed between two adjacent fingers of the plurality of elongate fingers. Additionally, in some embodiments, the crop deflector may engage the plurality of elongate fingers at locations on the cylindrical drum that are to the rear of a rotational axis of the drum.

In some embodiments, the plurality of elongate fingers may rotate about an axle disposed within the cylindrical drum, and the crop deflector may engage the plurality of elongate fingers at locations on the cylindrical drum that are behind the axle. Additionally, in some embodiments, the crop deflector may be disposed at an angle with respect to the cylindrical drum and the plurality of elongate fingers such that it lifts the crop material off the cylindrical drum and the plurality of elongate fingers when the drum rotates during operation.

In some embodiments, the crop deflector may have a lower portion that is generally planar and is immediately adjacent to the cylindrical drum and to the plurality of elongate fingers, the lower portion may be generally planar, and the lower portion may be disposed at an acute angle with respect to surface of the cylindrical drum. The acute angle may open in a forward direction such that a distance between the lower portion of the crop deflector and the cylindrical drum increases in a direction of cylindrical drum rotation.

In some embodiments, the crop deflector may be fixed to the frame and may not pivot with respect to the frame. The frame may include a member that extends across and covers the top of the cylindrical drum to define a gap therebetween, and the crop deflector may be disposed within the gap. The crop deflector may be removably fixed to the frame in the gap.

According to yet another aspect of the present disclosure further still, a crop deflector for an agricultural harvesting head may be provided, whereby the harvesting head may have a frame, an elongate reciprocating knife, left and right side conveyors, a center conveyor, and a drum conveyor. The frame may extend perpendicular to a direction of travel for harvesting crops. The elongate reciprocating knife may be fixed to a forward edge of the frame and configured to cut crop plants adjacent to the ground. The left side and right side conveyors may be configured to carry crops laterally inward to a central portion of the frame. The center conveyor may be disposed between the left side and right side conveyors, and the center conveyor may be disposed to receive cut crop material carried to the central portion of the frame by the left side and right side conveyors, and to carry the cut crop material rearward. The drum conveyor may be located directly behind and above the center conveyor, and the drum conveyor may include an elongate cylindrical drum supported for rotation on the frame at opposing ends of the cylindrical drum about a horizontal and laterally extending axis, and a plurality of elongate fingers extending through a side wall of the cylindrical drum. The crop deflector may include an elongate member that extends generally parallel to a longitudinal extent of the frame, and the elongate member may be rigidly fixed to the frame at a position between the frame and the elongate cylindrical drum.

In some embodiments, a lower edge of the elongate member may have a plurality of recesses, and each recess may be positioned to receive a corresponding one of the plurality of elongate fingers. Additionally, in some embodiments, each of the plurality of recesses may be disposed adjacent to the cylindrical drum at positions that are to the rear of rotational axis of the cylindrical drum.

In some embodiments, the lower portion of the crop deflector may be planar adjacent to the cylindrical drum, and the lower portion may be disposed at an acute angle with respect to an outer surface of the cylindrical drum. The elongate member may be disposed at the angle with respect to the outer surface of the cylindrical drum such that it lifts the crop material off the cylindrical drum and off the plurality of fingers when the drum rotates during operation.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
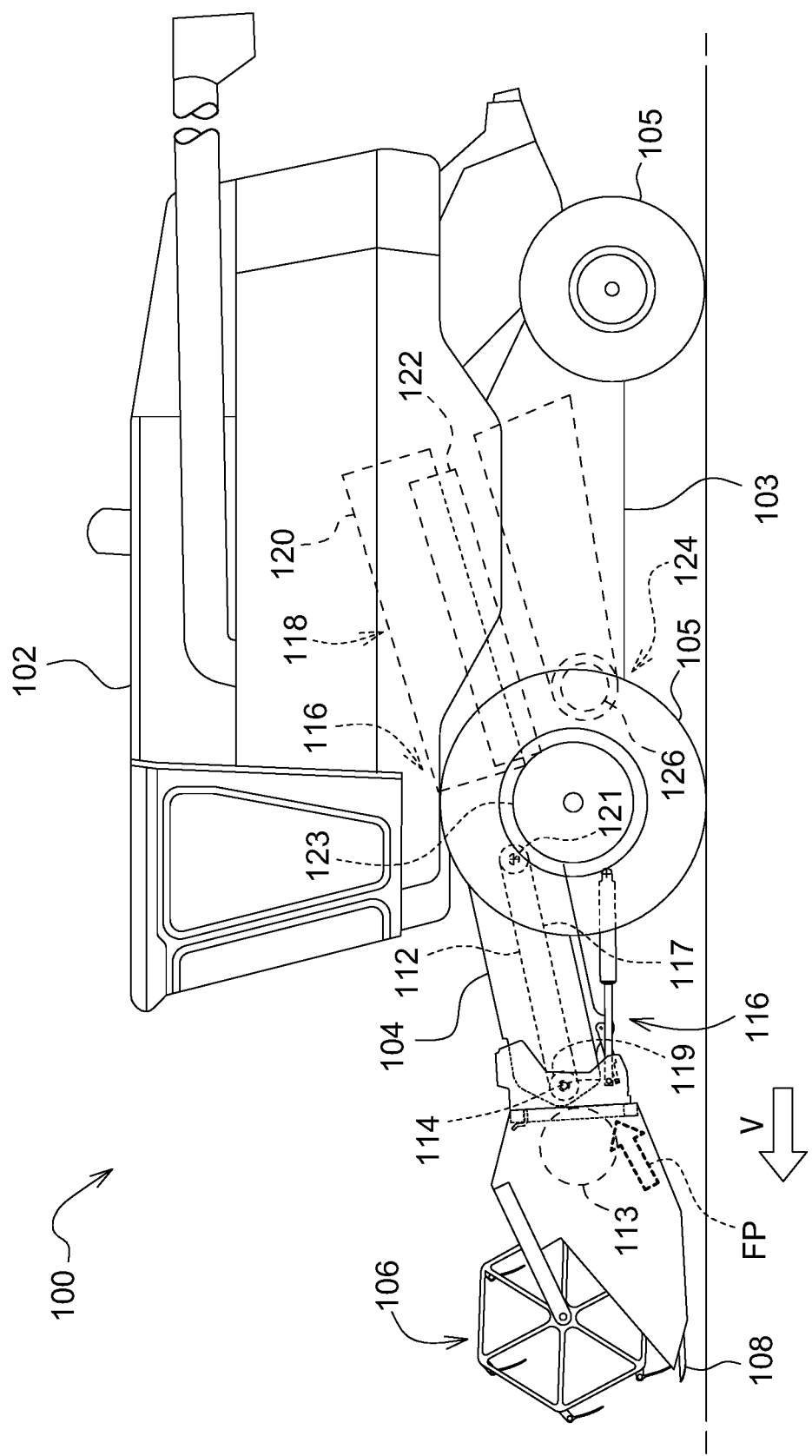
FIG. 1 is a side view of an agricultural combine.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an agricultural harvester 100 illustratively includes, or is otherwise embodied as, an agricultural combine 102 that is configured to travel through a field in a direction indicated by arrow V to harvest crops. Of course, it should be appreciated that in other embodiments, the harvester 100 may be embodied as, or otherwise include, another suitable harvesting machine. In any case, in the illustrative embodiment, the agricultural combine 102 is embodied as an agricultural harvesting vehicle including a chassis 103 that is supported on wheels 105 for travel through a field. A feeder house 104 coupled to and/or supported by the chassis 103 extends outwardly therefrom, and an agricultural harvesting head 106 coupled to the feeder house 104 extends outwardly from the feeder house 104.

Figure 2:
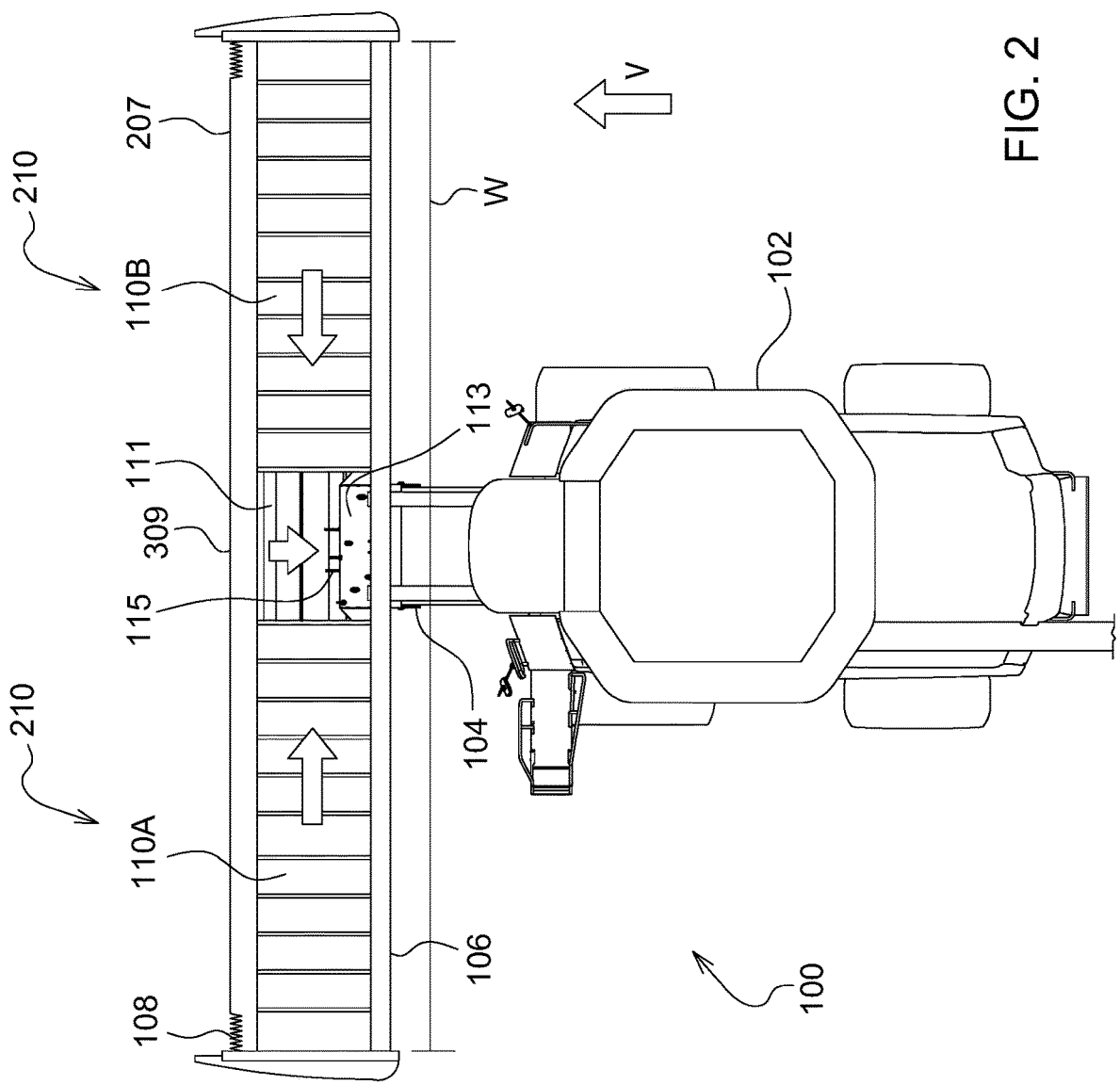
FIG. 2 is a top view of the agricultural combine of FIG. 1.
Figure 3:
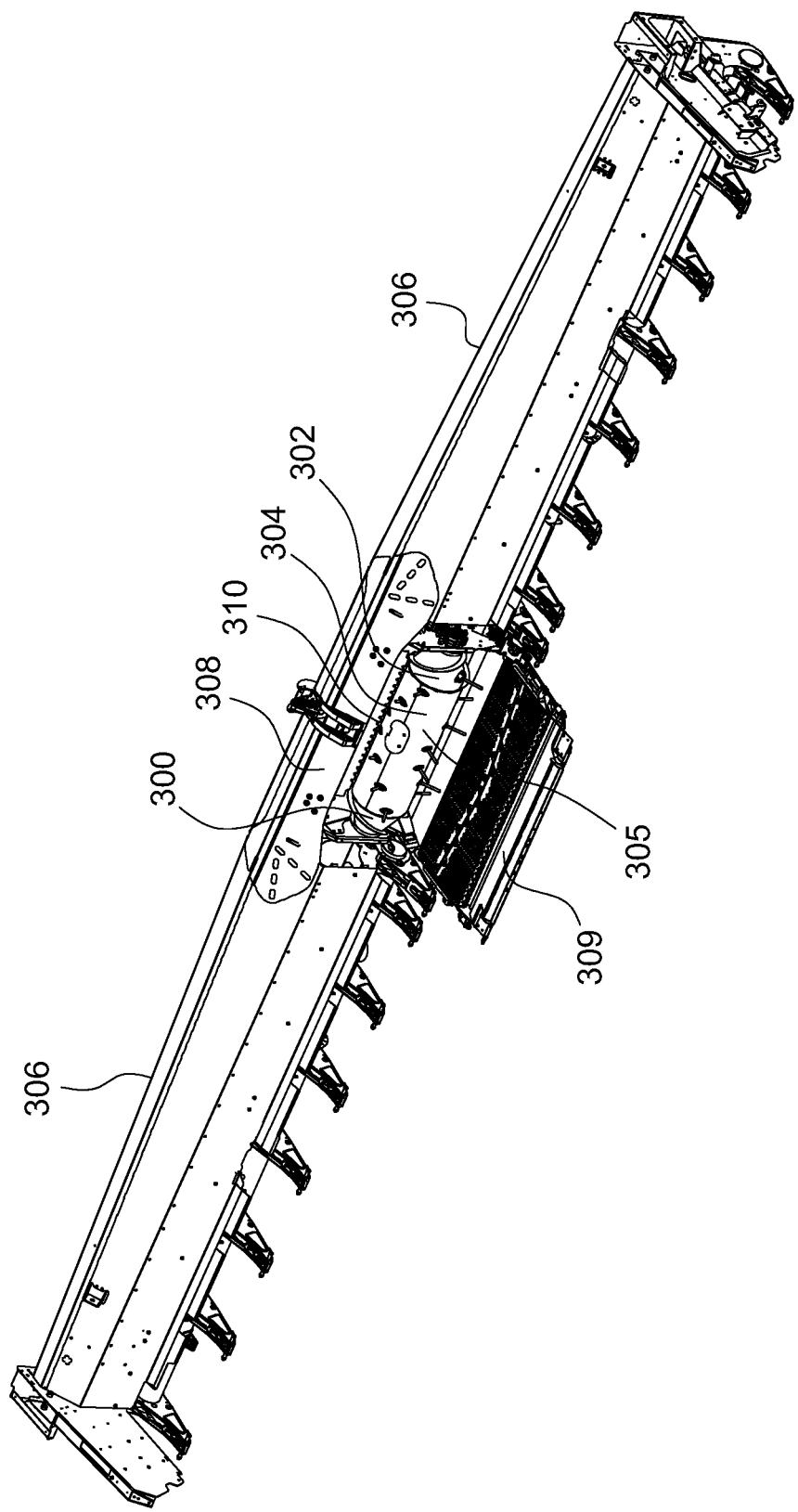
FIG. 3 is a perspective view of an agricultural harvesting head included in the combine of FIG. 1.

The illustrative harvesting head 106 includes a frame 306 (see FIG. 3), an elongate reciprocating knife 108, a conveyor system 210 (see FIG. 2), a drum conveyor 113, and a crop deflector 310 (see FIG. 3). The frame 306 is a stationary support structure that may be coupled to, supported by, or otherwise included in the chassis 103. The reciprocating knife 108 is coupled to a forward edge 207 of the frame 306 and configured to cut or sever crop material (not shown) adjacent to the ground. The conveyor system 210 is supported by the frame 306 and configured to carry cut crop material toward a central portion 309 of the frame 306 and rearward from the central portion 309. The drum conveyor 113 is located directly behind at least a portion of the conveyor system 210, and the drum conveyor 113 includes an elongate cylindrical drum 304 supported for rotation on the frame 306 about a drum axis DA and elongate fingers 115 that at least partially extend through an outer wall 305 of the cylindrical drum 304. The crop deflector 310 is supported by the frame 306 and positioned in close proximity to the outer wall 305 and the fingers 115. As described in greater detail below, the crop deflector 310 is configured to interface with the outer wall 305 and the fingers 115 to deflect crop material such that the deflected crop material may pass rearward of the drum conveyor 113 through the harvesting head 106 during operation thereof.

In the illustrative embodiment, crop material passed beneath the cylindrical drum 304 and rearward of the drum conveyor 113 flows along a crop flow path FP during operation of the harvesting head 106. For the purposes of the present disclosure, the crop flow path FP is representative of a desired flow path of crop through the harvesting head 106. In some situations, after passing beneath the drum 304 and being compressed by the drum 304, for instance, crop material may have a tendency to be conveyed over (i.e., vertically above) the drum 304, rather than rearward of the drum 304 along the crop flow path FP. In one example, crop material that is conveyed over the drum 304 may be ejected from the combine 102 and lost. In another example, crop material that is conveyed over the drum 304 may be directed forward of the cylindrical drum 304 and subjected to further compression by the drum 304. The illustrative crop deflector 310 may prevent, or otherwise substantially resist, crop material from being ejected from the combine 102 and/or directed forward of the cylindrical drum 304. Additionally, as further discussed below, the crop deflector 310 is located relative to the cylindrical drum 304 and the elongate fingers 115 to deflect crop material rearward along the crop flow path FP. In that sense, the crop deflector 310 directs crop material along the flow path FP and resists departure of the crop material therefrom during operation of the harvesting head 106.

Referring now to FIGS. 1 and 2, the illustrative conveyor system 210 includes a left side conveyor 110A, a right side conveyor 110B, and a center conveyor 111. Of course, it should be appreciated that in other embodiments, the conveyor system 210 may include another suitable number of conveyors. The left side conveyor 110A is arranged to the left of the center portion 309 of the frame 306, and the right side conveyor 110B is arranged to the right of the center portion 309. The center conveyor 111 is arranged substantially in-line with the center portion 309 (i.e., the center conveyor 111 is centrally located between the left and right side conveyors 110A, 110B). During operation of the harvesting head 106 and the combine 102, crop material severed from the ground by the elongate reciprocating knife 108 (which extends along a width W of the head 106) falls onto the left and right side conveyors 110A, 110B, which convey the cut crop material to the center conveyor 111. From there, cut crop material is conveyed rearward and beneath the cylindrical drum 304 of the drum conveyor 113.

In the illustrative embodiment, the elongate fingers 115 may be embodied as, or otherwise include, any features capable of interacting with cut crop material and directing the cut crop material beneath the cylindrical drum 304 and rearward along the crop flow path FP during operation of the harvesting head 106. In some embodiments, the elongate fingers 115 may be configured to directly contact and engage cut crop material mats. Regardless, in use of the harvesting head 106, the elongate fingers 115 are capable of directing the cut crop material into a forward opening 114 of the feeder house 104.

The illustrative feeder house 104 includes a feeder house conveyor 112 that is configured to carry cut crop material from the forward opening 114 to a body 116 of the combine 102. In doing so, the feeder house conveyor 112 conveys may cut crop material rearwardly and upwardly. The feeder house conveyor 112 includes a belt or chain 117 that winds around two rollers or sprockets 119, 121. The roller 119 is arranged adjacent to the forward opening 114. The roller 121 is arranged adjacent a rear opening 123 of the feeder house 104, which is illustratively arranged opposite the forward opening 114.

The body 116 of the illustrative combine 102 is located adjacent the rear opening 123 of the feeder house 104, as shown in FIG. 1. In the illustrative embodiment, the body 116 of the combine 102 may include, house, or otherwise be embodied as, a threshing and separating mechanism 118. The threshing and separating mechanism 118 includes an elongate cylinder or rotor 120 that is arranged in proximity to a grating 122. When rotatably driven, the cylinder 120 is configured to thresh and separate the cut crop material between the cylinder 120 and the grating 122.

The body 116 of the illustrative combine 102 may also include, house, or otherwise be embodied as a cleaning mechanism 124, as shown in FIG. 1. During operation of the combine 102, grain separated from the cut crop material (which may be referred to as straw) by the mechanism 118 falls through the grating 122 and into the cleaning mechanism 124. In some embodiments, the cleaning mechanism 124 may include one or more sieves or chaffers (not shown) through which air generated by a cleaning fan 126 is blown upwardly. In such embodiments, movement of air through the grain may separate light material or chaff from the grain and cause the chaff to be conveyed through the combine 102. Chaff blown upwardly through the combine 102 by the cleaning fan 126 may be ejected from the combine 102 and deposited on the ground.

Figure 4:
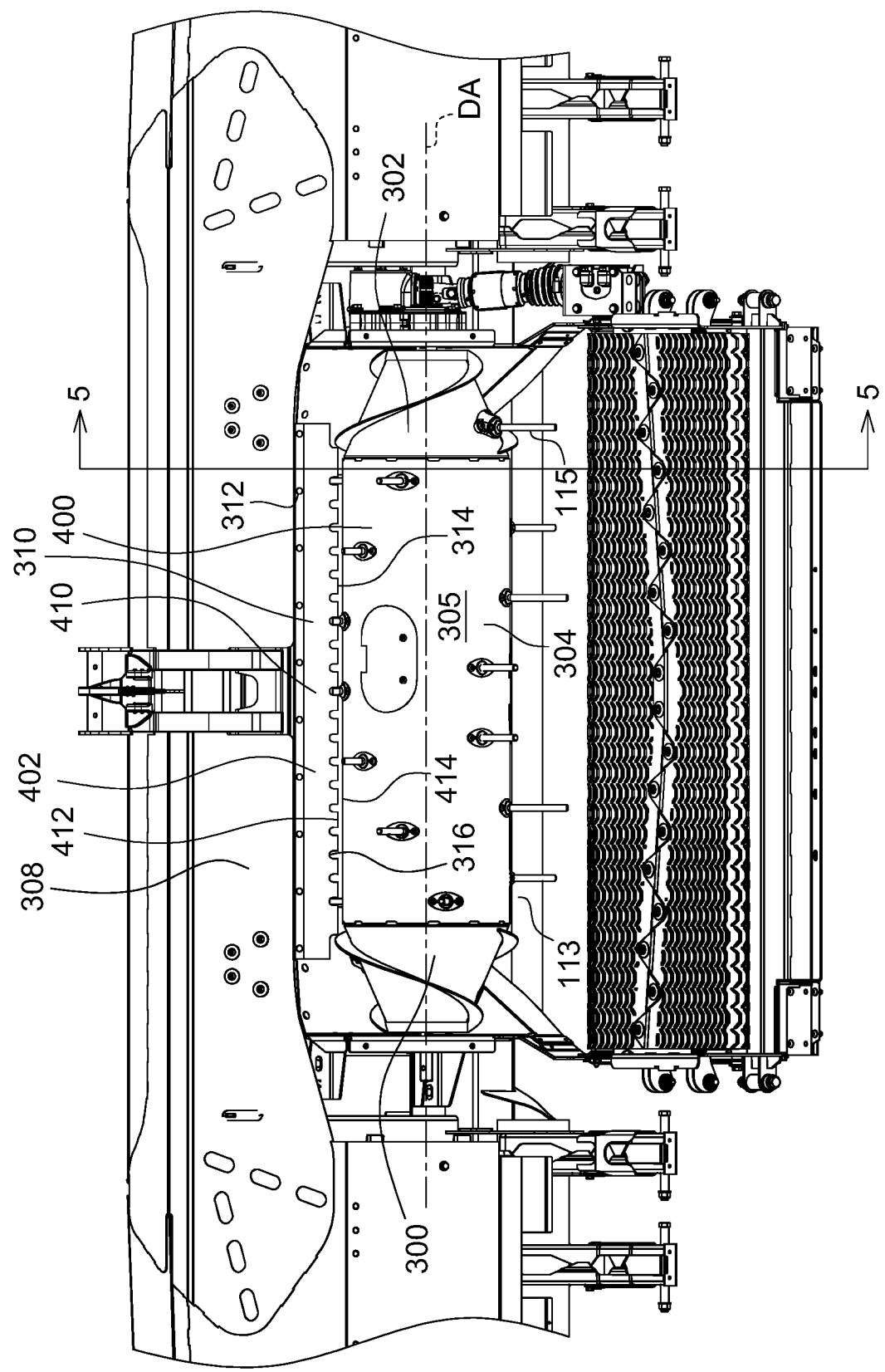
FIG. 4 is a front elevation view of a central region of the agricultural harvesting head of FIG. 3.

Referring now to FIGS. 3 and 4, the drum conveyor 113 is located substantially in-line with the central portion 309 of the frame 306. As best seen in FIG. 4, the cylindrical drum 304 includes a cylindrical body 400 and extensions 300, 302 coupled thereto that define opposite ends of the drum 304. In the illustrative embodiment, each of the extensions 300, 302 has a frustoconical cross-sectional shape. However, in other embodiments, the extensions 300, 302 may take the shape of other suitable geometric forms. In any case, the drum 304 is supported for rotation on the frame 306 at the extensions 300, 302.

Referring now to FIG. 4, a canopy member or portion 308 of the frame 306 illustratively extends over the top of the drum conveyor 113 to cover the drum conveyor 113. In doing so, the portion 308 and the cylindrical drum 304 cooperate to define a gap 402 therebetween. The crop deflector 310 is coupled to the canopy portion 308 and extends downwardly therefrom such that the crop deflector 310 is disposed in the gap 402. The crop deflector 310 is removably coupled to the portion 308 in the gap 402 by threaded fasteners 312 and thereby constrained against pivotal movement relative to the portion 308. As such, the crop deflector 310 is rigidly affixed to the portion 308 and located between the portion 308 and the cylindrical drum 304. As further discussed below with reference to FIG. 5, in the illustrative embodiment, the crop deflector 310 is positioned immediately adjacent to the outer wall 305 and the elongate fingers 115 near a rear or back side 504 of the cylindrical drum 304.

The illustrative crop deflector 310 includes, or is otherwise embodied as, an elongate, generally planar member 410. In the illustrative embodiment, the member 410 includes recesses 316 that are each configured to receive a corresponding one of the elongate fingers 115. The recesses 316 are formed in a lower portion 412 of the member 410. More specifically, the recesses 316 are formed in the lower portion 412 such that the recesses 316 extend upwardly away from a lower edge 414 of the crop deflector 310. The lower edge 414 extends continuously between adjacent recesses 316. The lower edge 414 is illustratively configured to engage the outer wall 305 of the cylindrical drum 304 and the elongate fingers 115 to deflect crop material during operation of the harvesting head 106.

Figure 5:
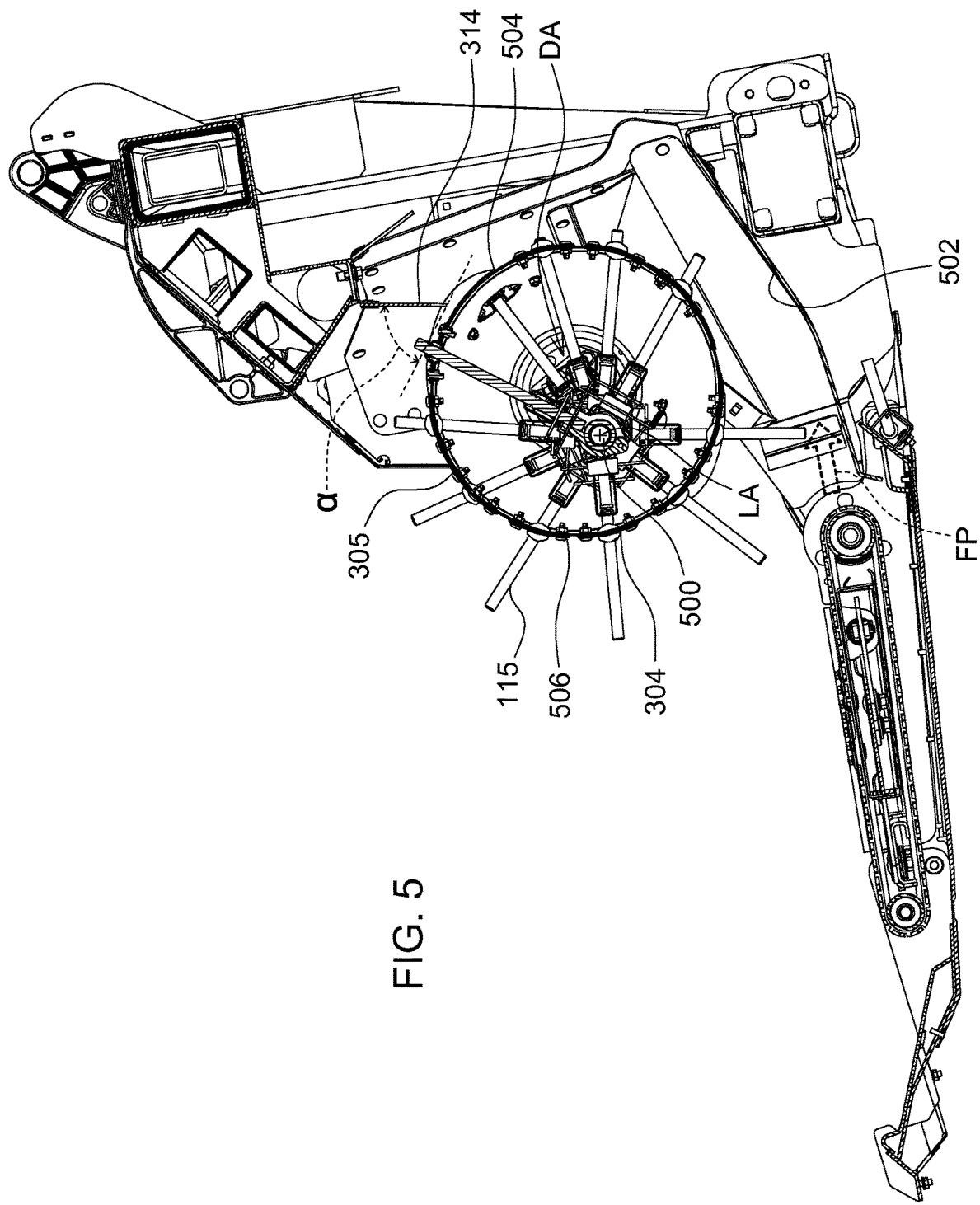
FIG. 5 is a cross-sectional view of the agricultural harvesting head taken about line 5-5 of FIG. 4.

Referring now to FIG. 5, in the illustrative embodiment, the elongate fingers 115 are supported on an axle 500 that is configured for rotation about a longitudinal axis LA. The fingers 115 are coupled to the axle 500 for common rotation therewith about the axis LA, and the longitudinal axis LA is located forward of the drum axis DA. Consequently, rotation of the elongate fingers 115 about the axis LA may be said to be offset from rotation of the cylindrical drum 304 about the axis DA. Due at least in part to the offset rotation of the elongate fingers 115 and the cylindrical drum 304, the fingers 115 alternately retract/withdraw into, and at least partially extend outside of, the drum 304 during operation of the harvesting head 106. It should be appreciated that, in response to rotation of the drum 304 about the axis DA, the drum 304 contacts the elongate fingers 115 to cause the fingers 115 to rotate about the axis LA.

The illustrative positioning of the axle 500 relative to the cylindrical drum 304 enables, or otherwise facilitates, full extension of the elongate fingers 115 outside of the outer wall 305 on a front side 506 of the drum 304, as shown in FIG. 5. As a result, the elongate fingers 115 may engage crop material mats on the front side 506 and pull the mats downward and beneath the drum 304 as the fingers 115 rotate about the axis LA. As the fingers 115 rotate toward the back side 504 of the drum 304 during operation of the harvesting head 106, the fingers 115 are withdrawn into the drum 304, thereby releasing the crop material mats. Contemporaneously with, or subsequent to, being released, the crop material mats may be compressed between the drum 304 and an arcuate floor 502 of the harvesting head 106.

In the illustrative embodiment, the lower edge 414 of the crop deflector 310 is configured to engage the elongate fingers 115 when the fingers 115 are withdrawn into the cylindrical drum 304. In some embodiments, such engagement may occur when the elongate fingers 115 extend minimally beyond the outer wall 305 of the cylindrical drum 304 during operation of the harvesting head 106. Additionally, in the illustrative embodiment, the lower edge 414 is configured to engage the elongate fingers 115 at locations behind the longitudinal axis LA and the drum axis DA.

The illustrative recesses 316 of the crop deflector 310 receive tips 510 of the elongate fingers 115 to enable, or otherwise facilitate, engagement between the crop deflector 310 and the fingers 115. Because the recesses 316 receive the elongate fingers 115 during operation of the harvesting head 106, the lower edge 414 of the crop deflector 310 may be positioned in closer proximity to the outer wall 305 of the cylindrical drum 304 than might otherwise be the case in other configurations. As a result, the crop deflector 310 is capable of deflecting more crop material rearward along the crop flow CP than similar devices having other arrangements.

In the illustrative embodiment, the lower portion 412 of the crop deflector 310 is located in close proximity to the cylindrical drum 304 and the elongate fingers 115 and disposed at an acute angle α relative to the outer wall 305 of the drum 304, as shown in FIG. 5. The crop deflector 310 is illustratively angled relative to the drum 304 and the fingers 115 such that the crop deflector 310 is configured to deflect crop material radially outward from the drum axis DA and away from the drum 304 and the fingers 115 during operation of the harvesting head 106. As such, the crop deflector 310 may interact with crop material or plant matter on the drum 304 and/or the fingers 115 in a manner that tends to lift the crop material or plant matter radially outward from the drum 304 and the fingers 115 and rearward along the crop flow path FP.

In FIGS. 1 and 2, an agricultural harvester 100 includes an agricultural combine 102 having a feederhouse 104 extending from the front of the agricultural combine 102, and the chassis 103 supported on at least one wheel 105 for travel through an agricultural field to harvest crops, and an agricultural harvesting head 106 supported on a forward end of the feederhouse 104. The agricultural harvester 100 travels in a direction of travel "V" through the field to harvest crop.

Crop plants are severed by reciprocating knife 108 that extends across the width of the agricultural harvesting head 106. The cut crop material falls backward onto two side conveyors 110. The two side conveyors 110 carry cut crop material to the middle of the agricultural combine 102. A center conveyor 111 receives the material from the two side conveyors 110 and conveys it rearward and underneath the forward portion of a drum conveyor 113.

Elongate fingers 115 extending from the outer surface of the drum conveyor 113 engage the top surface of the mat of cut crop material and carry it rearward, underneath the drum conveyor 113, and into a forward opening of the feederhouse 104. The feederhouse 104 has its own conveyor 112 that carries the cut crop material from the forward opening of the feederhouse 104 to the body of the agricultural combine 102. The feederhouse conveyor 112 carries the cut crop material rearward and upward. The feederhouse conveyor 112 includes an endless belt or chain that recirculates about two rollers or sprockets. One of the roller or sprockets is disposed at the forward opening of the feederhouse 104. The other roller sprocket is disposed at the rear opening of the feederhouse 104. The cut crop material is received into a gap formed between the floor of the feederhouse and the lower run of the endless belt or chain.

The agricultural combine 102 includes a threshing and separating mechanism 118 disposed inside the body of the combine 102. The mechanism 118 includes an elongate threshing cylinder or rotor 120 that is disposed inside a concave grating 122 and driven in rotation to thresh and separate the cut crop material between the rotor 120 and the grating 122.

Grain separated from the crop residue (called "straw") falls through gaps in the grating into a cleaning mechanism 124. The cleaning mechanism 124 includes one or more sieves/chaffers through which air generated by a cleaning fan 126 is blown upwardly. This movement of air separates light residue (called "chaff") from the grain and carries the chaff rearward through the combine and through an opening where it is deposited upon the ground. Crop residue that is carried to the rear of the threshing and separating mechanism 118 is transmitted to a rotary chopping conveyor (also known as a straw chopper), which chops the straw and spreads it over the ground.

Referring to FIGS. 3-5, the drum conveyor 113 is in the form of a generally right circular cylindrical drum 304 with two conical extensions 300, 302, with one extension 300, 302 on each of the two ends. The drum conveyor 113 is supported at each of its two opposing ends on the frame 306 of the agricultural harvesting head 106. The drum conveyor 113 is driven in rotation about a rotational axis that extends parallel to the longitudinal extent of the agricultural harvesting head 106.

The elongate fingers 115 extend outward through holes in the wall of the cylindrical drum 304. At their inner ends (shown more clearly in FIG. 5), the fingers 115 are fixed for rotation about and supported on an axle 500. Axle 500 has a longitudinal axis that is disposed forward from the rotational axis of the cylindrical drum 304. As the drum 304 is driven in rotation, the drum 304 engages each of the fingers 115 and drives them in rotation about the axle 500.

Due to the offset rotation of the fingers 115 with respect to the drum 304, the fingers 115 are alternately retracted into and pushed out of the drum 304 as the drum 304 and fingers 115 are driven in rotation. The axle 500 is located forward of the rotational axis of the drum 304 in order to fully extend the fingers 115 on the front side of the drum 304. This permits the fingers 115 to engage the thick crop mat and pull it downward and underneath the drum 304.

As the drum 304 rotates the fingers 115 downwardly, the fingers 115 are automatically retracted into the drum 304, thereby the releasing thick crop mat. This permits the thick crop mat to be compressed between the curved sheet-metal floor 502 and the bottom of the drum 304. As the drum 304 continues rotating, it rotates the fingers 115 rearwardly and then upwardly. At the same time, the fingers 115 continue to retract into the drum 304 until they are flush (or close to flush) with the surface of the drum 304.

A portion 308 of frame 306 extends across the top of the drum conveyor 113. Portion 308 covers substantially all of the drum conveyor 113. A crop deflector 310 is fixed to the underside of portion 308 and extends downward such that the lower edges of the crop deflector 310 are immediately adjacent to the outer surface of the drum 304 and the fingers 115 extending outwardly therefrom.

Crop deflector 310 is an elongate member that extends across substantially the entire longitudinal length of the drum conveyor 113. Crop deflector 310 is fastened to portion 308 with a plurality of threaded fasteners 312 that are spaced apart in a longitudinal direction along an upper portion of the crop deflector 310. Crop deflector 310 is mounted to portion 308 such that it is held in a fixed position with respect to the portion 308 and the drum conveyor 113.

The lower edge 314 of crop deflector 310 is generally straight. It includes, however, a plurality of recesses 316 that extend upward from the lower edge 314. The recesses 316 provide an opening along the lower edge 314 of the crop deflector that accommodates the tips of the fingers 115. By accommodating the tips of the fingers 115, the tips can pass through the recesses 316, and the lower edge 314 of the crop deflector can be positioned more closely to the outer cylindrical surface of drum 304. This permits the crop deflector 310 to deflect more crop material that might otherwise pass between the outer surface of drum 304 and the lower edge 314 of the crop deflector. It also permits the crop deflector 310 to deflect more crop material that might otherwise pass between adjacent fingers 115.

The crop deflector 310 is disposed at an acute angle alpha ($\alpha$) with respect to the outer surface of drum 304 along lower edge 314 of crop deflector 310. By this angular arrangement, the crop deflector 310 advantageously engages any plant matter on the drum 304 or the fingers 115 in a direction that tends to lift the plant matter radially outwardly away from the drum 304 and the fingers 115.

The crop deflector 310 is located above and to the rear of the rotational axis of the drum 304 and the fingers 115. It engages the drum 304 and the fingers 115 toward the rear portion of the drum. The crop deflector 310 engages the rear surface of the drum 304 and the fingers 115 as the fingers are moving upward on the backside of the drum 304.

To improve the ability of the crop deflector to prevent crop from being carried over across the upper surface of the drum, the recesses 316 engage the fingers 115 when the fingers 115 are substantially withdrawn into the drum 304. The crop deflector 310 is therefore positioned closely to the drum 304 and to the fingers 115 and deflects crop material rearward and back into the flow path of crop leaving the drum 304.

The embodiments disclosed in this application explain at least one arrangement of the invention in sufficient detail to permit someone skilled in the art to make at least one embodiment of the invention. Other arrangements and embodiments are possible, even expected. The invention itself is defined by the claims.

The invention claimed is:

1. A harvesting machine comprising:
a frame;
an elongate reciprocating knife coupled to a forward edge of the frame and configured to cut crop material adjacent to the ground;
a conveyor system supported by the frame and configured to carry cut crop material toward a central portion of the frame and rearward therefrom;
a drum conveyor located directly behind at least a portion of the conveyor system, wherein the drum conveyor includes an elongate cylindrical drum supported for rotation on the frame about a drum axis and a plurality of elongate fingers that at least partially extend through an outer wall of the cylindrical drum, wherein the cylindrical drum has a front side that faces the conveyor system and a back side arranged opposite the front side, and wherein the plurality of elongate fingers withdraw into holes formed in the outer wall of the cylindrical drum along the back side of the cylindrical drum such that the plurality of elongate fingers minimally extend beyond the outer wall of the cylindrical drum along the back side of the cylindrical drum in use of the harvesting machine; and
a crop deflector supported by the frame and positioned in close proximity to the outer wall of the cylindrical drum and the plurality of elongate fingers such that the crop deflector is located above and behind the drum axis and the plurality of elongate fingers adjacent the back side of the cylindrical drum, wherein the crop deflector is configured to interface with the outer wall of the cylindrical drum and the plurality of elongate fingers to deflect crop material such that the deflected crop material may pass rearward of the drum conveyor through the harvesting machine during operation thereof, and wherein when the plurality of elongate fingers are withdrawn into the cylindrical drum along the back side of the cylindrical drum, a lower edge of the crop deflector contacts the plurality of elongate fingers along the back side of the cylindrical drum to deflect crop material rearward in use of the harvesting machine.

2. The harvesting machine of claim 1, wherein the crop deflector includes a plurality of recesses that are each configured to receive a corresponding one of the plurality of elongate fingers.

3. The harvesting machine of claim 2, wherein the plurality of recesses extend upwardly away from the lower edge of the crop deflector, and wherein the lower edge extends continuously between adjacent recesses of the plurality of recesses.

4. The harvesting machine of claim 1, wherein the lower edge of the crop deflector is configured to engage the outer wall of the cylindrical drum and the plurality of elongate fingers to deflect crop material during operation of the harvesting machine.

5. The harvesting machine of claim 1, wherein the crop deflector includes a lower portion that is generally planar and located in close proximity to the cylindrical drum and to the plurality of elongate fingers, and wherein the lower portion is disposed at an acute angle relative the outer wall of the cylindrical drum.

6. The harvesting machine of claim 5, wherein the crop deflector is angled relative to the cylindrical drum and the plurality of elongate fingers such that the crop deflector is configured to deflect crop material radially outward from the drum axis and away from the cylindrical drum and the plurality of elongate fingers during operation of the harvesting machine.

7. The harvesting machine of claim 1, wherein the plurality of elongate fingers are supported on an axle that is configured for rotation about a longitudinal axis during operation of the harvesting machine, and wherein the longitudinal axis is located forward of the drum axis.

8. The harvesting machine of claim 7, wherein the crop deflector is configured to engage the plurality of elongate fingers at locations behind the longitudinal axis and the drum axis during operation of the harvesting machine.

9. The harvesting machine of claim 1, wherein the crop deflector is constrained against pivotal movement relative to the frame.

10. The harvesting machine of claim 1, wherein the frame includes a member that covers the cylindrical drum to define a gap between the member and the cylindrical drum, and wherein the crop deflector is disposed in the gap.

11. The harvesting machine of claim 10, wherein the crop deflector is removably coupled to the frame in the gap.

12. An agricultural harvesting head comprising:
a frame;
an elongate reciprocating knife coupled to the frame and configured to cut crop material;
at least one conveyor configured to carry cut crop material rearward;
a drum conveyor located behind the at least one conveyor, wherein the drum conveyor includes an elongate cylindrical drum supported for rotation on the frame about a drum axis and a plurality of elongate fingers that at least partially extend through an outer wall of the cylindrical drum, wherein the cylindrical drum has a front side that faces the at least one conveyor and a back side arranged opposite the front side, and wherein the plurality of elongate fingers withdraw into holes formed in the outer wall of the cylindrical drum along the back side of the cylindrical drum such that the plurality of elongate fingers minimally extend beyond the outer wall of the cylindrical drum along the back side of the cylindrical drum in use of the agricultural harvesting head; and
a crop deflector including an elongate member that is rigidly affixed to the frame and located above and behind the drum axis and the plurality of elongate fingers adjacent the back side of the cylindrical drum, wherein when the plurality of elongate fingers are withdrawn into the cylindrical drum along the back side of the cylindrical drum, a lower edge of the elongate member contacts the plurality of elongate fingers along the back side of the cylindrical drum to deflect crop material rearward in use of the agricultural harvesting head.

13. The agricultural harvesting head of claim 12, wherein the crop deflector is configured to interface with the outer wall of the cylindrical drum and the plurality of elongate fingers to deflect crop material such that the deflected crop material may pass rearward of the drum conveyor through the agricultural harvesting head during operation thereof.

14. The agricultural harvesting head of claim 12, wherein the lower edge of the elongate member includes a plurality of recesses, and wherein each of the plurality of recesses is positioned to receive a corresponding one of the plurality of elongate fingers.

15. The agricultural harvesting head of claim 14, wherein the plurality of recesses are disposed in close proximity to the cylindrical drum and the plurality of elongate fingers at locations behind the drum axis.

16. The agricultural harvesting head of claim 12, wherein the crop deflector includes a lower portion that is generally planar and located in close proximity to the cylindrical drum and to the plurality of elongate fingers, and wherein the lower portion is disposed at an acute angle relative the outer wall of the cylindrical drum.

17. The agricultural harvesting head of claim 16, wherein the crop deflector is angled relative to the cylindrical drum and the plurality of elongate fingers such that the crop deflector is configured to deflect crop material radially outward from the drum axis and away from the cylindrical drum and the plurality of elongate fingers during operation of the agricultural harvesting head.

18. The agricultural harvesting head of claim 12, wherein the plurality of elongate fingers are supported on an axle that is configured for rotation about a longitudinal axis during operation of the agricultural harvesting head, the longitudinal axis is located forward of the drum axis, and the crop deflector is configured to engage the plurality of elongate fingers at locations behind the longitudinal axis and the drum axis during operation of the agricultural harvesting head.

19. An agricultural harvesting head comprising:
a frame;
an elongate reciprocating knife coupled to the frame and configured to cut crop material;
at least one conveyor configured to carry cut crop material rearward;
a drum conveyor located behind the at least one conveyor, wherein the drum conveyor includes a cylindrical drum supported for rotation on the frame about a drum axis and a plurality of elongate fingers that at least partially extend through an outer wall of the cylindrical drum, wherein the cylindrical drum has a front side that faces the at least one conveyor and a back side arranged opposite the front side, wherein the plurality of elongate fingers withdraw into holes formed in the outer wall of the cylindrical drum along the back side of the cylindrical drum such that the plurality of elongate fingers minimally extend beyond the outer wall of the cylindrical drum along the back side of the cylindrical drum in use of the agricultural harvesting head, and wherein the plurality of elongate fingers are supported on an axle that is configured for rotation about a longitudinal axis that is located forward of the drum axis; and
a crop deflector that is rigidly affixed to the frame and located above and behind the drum axis and the plurality of elongate fingers adjacent the back side of the cylindrical drum to deflect crop material such that the deflected crop material may pass rearward of the drum conveyor through the agricultural harvesting head during operation thereof, wherein when the plurality of elongate fingers are withdrawn into the cylindrical drum along the back side of the cylindrical drum, a lower edge of the crop deflector contacts the plurality of elongate fingers along the back side of the cylindrical drum to deflect crop material rearward in use of the agricultural harvesting head.

* * * * *